(12) United States Patent
Ortiz et al.

(10) Patent No.: US 7,949,971 B2
(45) Date of Patent: *May 24, 2011

(54) METHOD AND APPARATUS FOR ON-THE-FLY MINIMUM POWER STATE TRANSITION

(75) Inventors: Alberto Garcia Ortiz, Seville (ES); Cedric Lichtenau, Stuttgart (DE); Norman J. Rohrer, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 599 days.
This patent is subject to a terminal disclaimer.

(21) Appl. No.: 11/966,493

(22) Filed: Dec. 28, 2007

(65) Prior Publication Data
US 2009/0172615 A1 Jul. 2, 2009

Related U.S. Application Data

(63) Continuation-in-part of application No. 11/691,856, filed on Mar. 27, 2007, now Pat. No. 7,757,137.

(51) Int. Cl.
*G06F 17/50* (2006.01)
*H01L 25/00* (2006.01)
*H03K 19/00* (2006.01)

(52) U.S. Cl. .......... 716/104; 716/103; 716/119; 326/41; 326/47; 326/101

(58) Field of Classification Search ................ 716/9, 10, 716/17; 326/41, 47, 101
See application file for complete search history.

(56) References Cited

U.S. PATENT DOCUMENTS 4,628,217 A * 12/1986 Berndt ............................ 326/48
5,055,710 A * 10/1991 Tanaka et al. ................... 326/47
6,297,668 B1 * 10/2001 Schober ......................... 326/101
(Continued)

OTHER PUBLICATIONS

Murata et al., "A Novel High-speed Latching Operation Flip-Flop (HLO-FF) Circuit and Its Application to a 19 Gb/s Decision Circuit Using 0.2 um GaAs MESFET", 16th Annual Gallium Arsenide Integrated Circuit (GaAs IC) Symposium, Oct. 16-19, 1994, pp. 193-196.*

(Continued)

*Primary Examiner* — Phallaka Kik
(74) *Attorney, Agent, or Firm* — Scully, Scott, Murphy & Presser, P.C.; Richard M. Kotulak, Esq.

(57) ABSTRACT

The invention includes a design structure embodied in a computer readable medium for performing a method for inserting a scan chain into a VLSI circuit design. The scan chain structure, or structures, are included in the design structure for the VLSI circuit design. The scan chain structure includes a first flip-flop (L1) and a second flip-flop (L2) configured to operate the first flip-flop (L1) in normal mode operation, in scan mode operation, in initialization mode and in low leakage power mode operation. A buffer circuit is electrically connected between the scan-out output of the second flip-flop (L2) and the scan-in input of the first flip-flop (L1) for the next latch in the scan chain. Buffer circuit control elements control the first flip-flop (L1) to switch between scan mode or low power leakage mode. The switching occurs in only one clock cycle. The design structure can include a netlist, which describes the VLSI circuit, reside on storage medium as a data format used for the exchange of layout data of integrated circuits, and preferably includes at least one of test data files, characterization data, verification data, or design specifications.

7 Claims, 3 Drawing Sheets

U.S. PATENT DOCUMENTS

| | | | |
|---|---|---|---|
| 6,938,225 B2 * | 8/2005 | Kundu | 716/1 |
| 7,571,402 B2 * | 8/2009 | Hossain | 716/5 |
| 7,669,098 B2 * | 2/2010 | Kapur et al. | 714/726 |
| 2007/0273420 A1 * | 11/2007 | Torvi et al. | 327/202 |
| 2008/0141188 A1 * | 6/2008 | Kapur et al. | 716/4 |
| 2008/0238494 A1 * | 10/2008 | Ortiz et al. | 327/105 |
| 2009/0193307 A1 * | 7/2009 | Hossain | 714/731 |

OTHER PUBLICATIONS

Ramanarayanan et al., "Characterizing Dynamic and Leakage Power Behavior in Flip-Flops", 15th Annual IEEE International ASIC/SOC Conference, Sep. 22-28, 2002, pp. 433-437.*

Zyuban, "Optimization of Scannable Latches for Low Energy", IEEE Transactions on Very Large Scale Integration (VLSI) Systems, vol. 11, No. 5, Oct. 2003, pp. 778-788.*

* cited by examiner

METHOD AND APPARATUS FOR ON-THE-FLY MINIMUM POWER STATE TRANSITION

CROSS-REFERENCE TO RELATED APPLICATIONS

The present application is a continuation in part application of U.S. patent application Ser. No. 11/691,856, filed Mar. 27, 2007, now U.S. Pat. No. 7,757,137 B2.

BACKGROUND OF THE INVENTION

The present invention relates to improved power leakage control in very large scale integrated (VLSI) circuits, and more particularly relates to a design structure for fabricating a scan-based VLSI circuit with improved input vector control (IVC), by use of scan-chain logic to set sleep mode and reset flip flops comprising the scan-chain logic from a low-power state with the same logical values that the flip-flops were set to at initialization.

This and related power leakage problems in VLSI processors are discussed in detail in a paper by Rohrer, et al., POWERPC 970 IN 130 NM AND 90 NM TECHNOLOGY, Pages 68-69, ISSCS 2004. Power leakage reduction in VLSI processors is not just an issue for operation and performance, but in manufacturing as well. For example, DAC's publication FUTURE PERFORMANCE CHALLENGES IN NANOMETER DESIGN, pages 3-8, DAC 2001, reports that a reduction of 10 W in the power consumption of the Intel Pentium microprocessor is known to realize a decrease in packaging cost by more than three. For that matter, leakage power consumption for normal operation causes a secondary power consumption in energy to cool the IC as a consequence. If not cooled, increased temperature conditions can degrade IC performance and reliability.

Consequently, various processes and techniques have developed for reducing power dissipation, whether by attempting to reduce static leakage current or prevent unnecessary switching, to name two. For example, in a paper by Abdollahi, et al., LEAKAGE CURRENT REDUCTION IN CMOS VLSI CIRCUITS BY INPUT VECTOR CONTROL (IVC), vol. 12, IEEE Trans. On VLSI Systems (No. 2, February 2004), the authors provide some promising insight on power reduction using input vector control (IVC) processes and suggested improvements. IVC techniques introduce sleep transistors into the VLSI design to mitigate increased leakage current. Other work concerning IVC designs includes Rao, et al., A HEURISTIC TO DETERMINE LOW LEAKAGE SLEEP STATE VECTORS FOR CMOS COMBINATIONAL CIRCUITS, pages 689-692, ICCAD 2003, and Chopra, et al., IMPLICIT PSEUDO BOOLEAN ENUMERATION ALGORITHMS FOR INPUT VECTOR CONTROL, pages 767-772, DAC 2004 (Jun. 7-11, 2004). The cited references appear to agree that leakage power consumption within an IC device depends strongly on the state of the IC device input and of the internal memory elements (e.g. latches), which affects switching and leakage significantly.

Input Vector Control (IVC) techniques exploit the property that controlling input state can reduce chip-wide power consumption, as discussed in the referenced papers, and in U.S. Pat. No. 7,100,144 to Jacobson et al., commonly owned and incorporated by reference herein. In scan-based VLSI designs, flip-flops are connected to enable two modes of operation: normal mode and test mode. The inputs are multiplexed to operate both modes separately. During test, a test vector is applied in scan mode; the sequential or combinatorial logical circuit state outputs are captured in the flip-flops as configured in normal operational mode. This operation is modified to place the same logical circuits in stand-by or sleep mode. That is, during sleep mode, the device inputs are forced to a state in which power consumption due to leakage is minimal using the IVC concept. Abdollahi asserts that attainable static power reductions that approach 25% are readily achievable using their method, which is substantial.

The processes discussed by Abdollahi and Chopra include inserting a multiplexer at particular nodes in IC designs and using IVC to stimulate the combinational logic to the desired low leakage state. The multiplexer is controlled with a sleep signal for compelling the gates to their low-leakage state. During normal operational mode, the multiplexer selects the original signal directed as the circuit input, and passes it to the logic gate(s). When in sleep mode, a signal that defines a low-leakage output state (derived from the IVC vector) is provided to the logical gate input. Abdollahi proposes refining the process by reducing the multiplexer to simpler gates. The Abdollahi approach, however, has its drawbacks. For example, the suggested approach introduces additional logic in the critical circuit or logic paths, which degrades or slows timing. In addition, Abdollahi's approach requires a global sleep signal with a very large fan-in/fan-out. This results in a large routing overhead in the original circuit floorplan, where the fan-out tree itself consumes significant static and dynamic power each time the additional logic path sets and resets the sleep mode.

Abdollahi suggests a second related technique wherein a third latch is added to the two traditional latches comprising a conventional master-slave flip-flops, which are used globally throughout the VLSI circuit for signal throughput. The use of the third latch provides a means for forcing and restoring the state of the flip-flops during sleep mode operation. Besides adding the third latch, sleep control logic and multiplexer logic similar to the combinational logic must be included to accomplish the control. Hence, the second Abdollahi technique also imposes large area overhead, limiting the benefit for their stated purpose. More, the second technique may impose other global sleep mode complications in the ICs or IC processors within which they would be implemented.

Abdollahi also suggest a scan chain approach, which uses a scan path design to shift the logical circuits or gates to a low leakage state. In its simplest form, the Abdollahi scan chain approach requires an additional memory equivalent in size with the scan chain to restore the values of the latch circuits to their operational state, resetting them from sleep mode. That is, by controlling only the master latch (L1) part of the flip-flop, Abdollahi suggest that it is possible to employ the scan path to set the latch circuit output to a low leakage state. Such an approach includes an area overhead for at least the memory, and may counteract any improvement in stemming current leakage that could be realized.

German Patent Application No. DE 920050016US1 to T. Gemmeke, commonly owned and incorporated by reference herein, suggests an IVC-based approach that includes modifying the feedback loop of a master slave flip-flop to allow asynchronous controllability of the slave. The approach is unique, and appears promising but for the fact that its implementation would require a modification of standard latch technology design. That is, implementing such an approach in an existing IC or processor design would require modifying flip-flop design globally, and would therefore be disruptive in the design's manufacturing process. Required redesign would be likely to negatively impact project scheduling when the modified flip-flops are incorporated into existing designs. Moreover, the new proposed flip-flops would be inherently slower because of the third latch, so that overall timing during normal operational mode would be adversely affected, further complicating redesign efforts.

What would be desirable, therefore, in the field of VLSI circuit design and manufacture, is an improved IVC-based design and operation, which does not result in timing degradation in critical IC pathways, particularly for microprocessors, but realizes lowered global power dissipation throughout the IC or IC processor. The benefits should also minimize additional logic circuits and area overhead should realize lower power consumption during sleep mode operation that is, during set and reset, and should not affect conventional design and manufacturing flow.

SUMMARY OF THE INVENTION

To that end, the present invention provides a design structure that implements novel improved input vector control (IVC), in a method referred to as "on-the-fly minimum power transition." The novel "on-the-fly minimal power transition" method, and the design structure that enables same takes advantage of the fact that large portions of microprocessor logic is comprised of pipelines and quiescent functional units that need not be restored to their pre-sleep mode state when exiting from low power or sleep mode states. In many cases, it is sufficient to reset latches with the same logical values that the flip-flops are set to at initialization. Hence, the inventive structure and method takes advantage of existing logic circuits for initialization. This invention inserts an IVC circuit in IC scan path to apply the input vector to be set for IVC in just one cycle. The IVC circuit also allows exiting sleep mode and reinitializing the latch in one additional cycle. This reduces the power consumption required to enter and exit the sleep mode. The area overhead for implementing the novel sleep mode operation is minimal as well.

The inventive structure and associated VLSI designs shows no timing degradation in the critical paths as found in prior art attempts to minimize power loss using IVC schemes. The inventive structure may be seamlessly integrated in standard design flows. That is, the benefit of using the novel structure and method in VLSI design realizes a resulting reduction in the dynamic power consumption of the scan chains (i.e., switching power is eliminated during functional operation), and a fast transition in/out of the low leakage state. Fast transition in and out of leakage state realizes marked decrease in consumed power due to minimized latch toggling. And as known, for testability reasons, the scan paths cover almost every latch in a microprocessor design. Thus, during normal operational mode, there is minimal unnecessary toggling or switching, and less global power dissipation throughout the IC therefore.

The invention further includes a design structure for a VLSI circuit that is embodied in a machine readable medium, which design structure is used in a design process, and includes an IVC-based scan-chain for implementing lowered global power dissipation in the VLSI circuit. The scan chain comprises at least two flip-flops configured to operate in normal mode operation, in scan mode operation and in low leakage power mode operation, where each flip-flop includes a data input, a data output, a clock input, a scan-in input and a scan-out output. An input vector control (IVC) circuit electrically connected between the scan-out output of one of the plurality of flip-flops and the scan-in input of a next flip-flop within a scan chain. The IVC circuit comprises a mode control element for controlling operation of the one flip-flop to one of scan mode, low power leakage mode and initialization mode, wherein the one flip-flop is set to a data output value upon exit from low power leakage mode that is equivalent to the flip-flop is set to at initialization during normal mode operation.

The design structure may comprise a netlist, which describes the VLSI circuit. The design structure preferably resides on storage medium as a data format used for the exchange of layout data of integrated circuits. The design structure includes at least one of test data files, characterization data, verification data, or design specifications.

BRIEF DESCRIPTION OF THE DRAWING FIGURES

FIG. 1 is a circuit diagram of a conventional scan chain, and the novel scan chain of this invention that highlights replacement of a simple inverter in a conventional scan chain with a novel IVC force cell of the invention;

FIGS. 2a, 2b, 2c and 2d identify four (4) types of the IVC force cells as seen in FIG. 1;

DETAILED DESCRIPTION OF THE INVENTION

Figure 1:
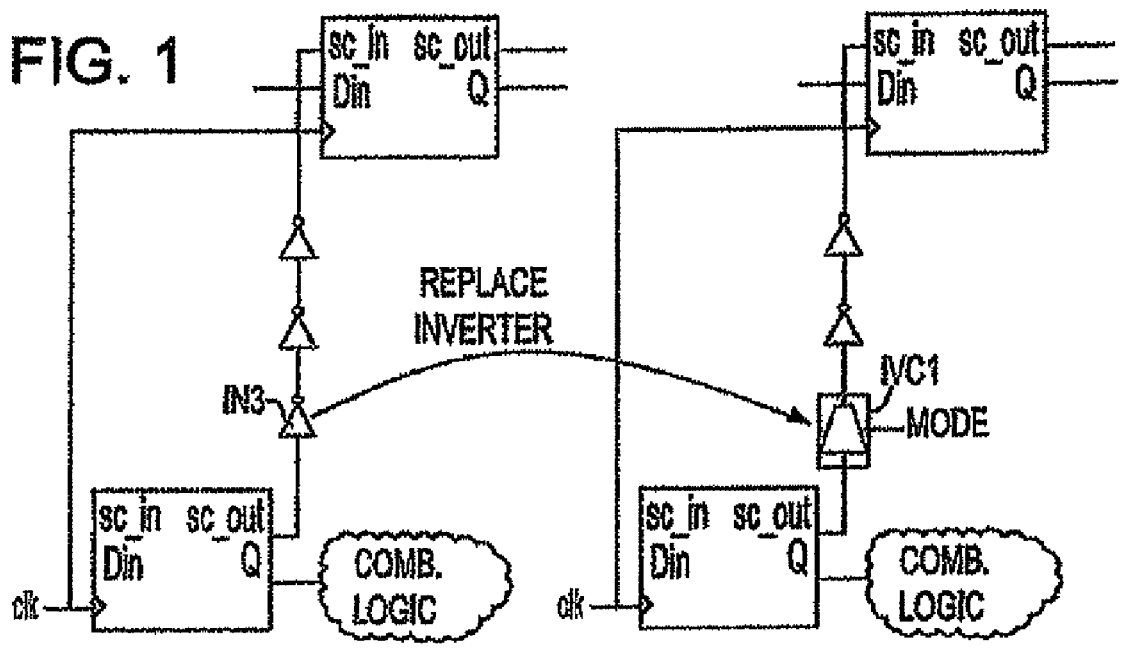

At initialization, many conventional VLSI designs, i.e., microprocessors, do not initialize their flip-flops with a global reset, which would require routing a global signal and consequential degrading of the flip-flop timing. Such conventional designs instead use the scan-path to force an initial value at flip-flops, such as that design disclosed in commonly owned U.S. Pat. No. 7,100,144. Hence, in order to reset N latches, the conventional scan-path approaches require circa N clock cycles. The drawback is that where N is very large (which it is in many typical VLSI microprocessor designs), initialization time becomes critical, particularly in certain applications (e.g., Telco market, real time applications, etc).

The inventive method and VLSI scan chain structure disclosed herein provide for an improved level sensitive scan design (LSSD) or scan-path approach. The novel approach may be described broadly as "on-the-fly minimum power transition". The "on-the-fly minimum power transition" implements a novel IVC-controlled sleep mode operation, and is readily applicable to general scan designs (GSD). When exiting sleep mode, large portions of IC logic comprising pipelines and quiescent functional units may be reset, regardless of their operational state at the time they entered sleep mode, rather than restoring to their pre-sleep states as in known prior art techniques. This obviates the need to store the pre-sleep states or logical values that the flip-flops were logically set to.

Put another way, the inventive structure utilizes the settings that are normally used for initialization to reset the flip-flops when exiting sleep mode, taking advantage of the redundancy of the existing initialization logic circuits that are typical in the multiplexer-based VLSI processors of the prior art. This results in a sleep mode operation with little or no timing degradation in microprocessor's critical pathways as logic is only added to the scan path that is usually run at a lower frequency, and minimal additional logic and area overhead for its implementation in ICs constructed based on the invention. The inventive displays desirable low power consumption and single cycle transition time when entering and exiting the low power or sleep mode, and maintains seamless integration in standard or legacy design flow when incorporated.

As mentioned, the significant core principle in the novel IC design and operation lies in its use of the intrinsic redundancy of the structure that is already included in any such LSSD or GSD based VLSI processor. During operation, the IC that includes the novel scan chain with the novel IVC circuit and functioning conducts a scan-mode operation, an initialization operation, or a low-power IVC operation. By its novel force cell-based scan chain structure and operation, the inventive LSSD IC design creates and uses separate system and scan clocks to distinguish between normal and test (scan) modes. Latches are used in pairs, where each has a normal data input, data output and clock for normal operational mode. For test mode operation, the two latches form a master-slave pair with one scan input, one scan output and non-overlapping scan clock held low during normal system operation. Scan data is latched when the latches are pulsed high for the testing or normal scan-path operation. To enter sleep mode, the mode pin is held high and the scan clock is pulsed once. When exiting sleep mode, the IC latches are merely reinitialized by pulsing the scan clock again while holding the mode pin low.

To implement the invention in normal scan chain circuitry, one inverter in the latch scan chain logic is replaced with a logical circuit referred to herein as an "IVC force cell." FIG. 1 depicts the essence of the inventive modification to a prior art scan chain (the left-hand side of FIG. 1), highlighting inventive replacement of an inverter IN3 with a special IVC force cell, or IVC1, in the right-hand side of FIG. 1. For that matter, FIGS. 2a, 2b, 2c and 2d identify four (4) types of the IVC force cells as seen in FIG. 1. Each IVC force cell includes a data input "a," a mode control input "mode," and a data output "y."

Figure 2A:
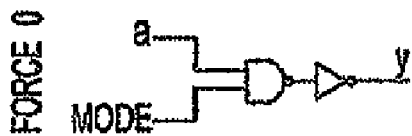
Figure 2B:
Figure 2C:
Figure 2D:
Figure 3:
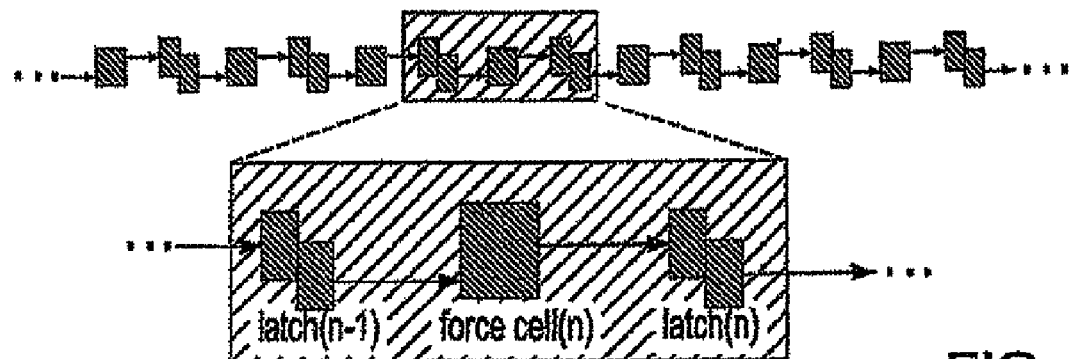
FIG. 3 depicts a scan chain within which is inserted an IVC circuit of this invention.

The IVC force cells of FIGS. 2a and 2c are for non-inverting logical requirements, where the FIGS. 2b and 2c cells are for inverting logical requirements. The IVC force cells designated as "Force 0" in FIGS. 2a-d indicate the need to force a 0 during sleep mode. When using a "Force 1" block, the IVC force cells hold the scan-out signal to a fixed value of 1, preventing switching. That is, of the first row (FIGS. 2a and 2b) are used to force the next latch in the scan path to 0 when entering sleep mode. The force cell depicted in 2a is used if the initialization value for this latch is 0 and the sleep mode value for the previous latch in the scan path is also 0 else the force cell depicted in 2b is used. Similarly the force cells shown in FIGS. 2c and 2d are used if the latch should be forced to a 1 during sleep mode. The arrangement of the inventive logical circuitry may be inserted with scan paths as shown in FIG. 3.

Figure 4:
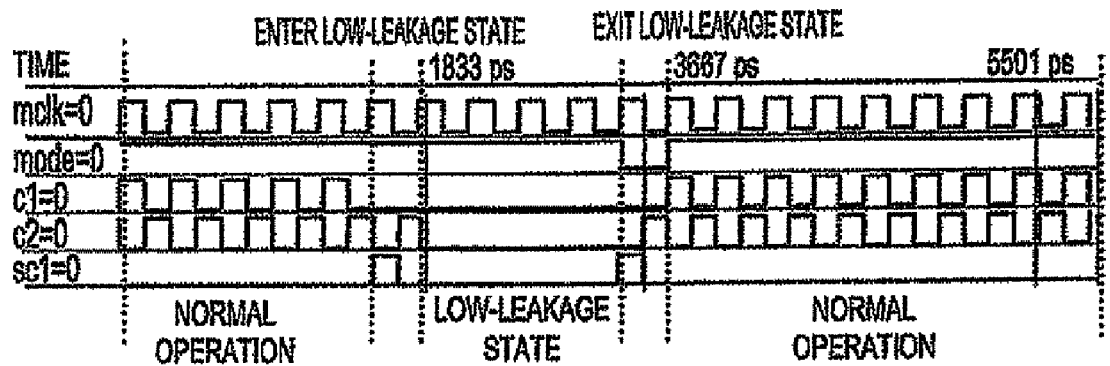
FIG. 4 depicts a set of timing diagrams that identify the timing of the present inventive scan chain during normal, low-leakage state and the transition back to normal operations.

By selecting the appropriate IVC force cell for each latch of an IC allows for the novel IVC-based sleep mode operation, initialization operation, scan-mode operation and normal operation to be supported. FIG. 4 shows the timing during normal operation where the IC is constructed to include "on-the-fly minimum power transition" using the novel IVC force cells. When the IVC control sets the mode signal to a "1", a fixed value is held in the scan path equal to a Low-Leakage-Vector (the IVC vector), that is, set into the flip-flops by the test clock (mode=1). A pulse on the test clock initiated by the IVC control latches the Low-Leakage-Vector into the flip-flops. No additional signal must be toggled to conduct the sleep mode operation. When exiting sleep mode to return back into normal (reset) operation mode (mode=0), the mode input is set to 0, and a pulse in the test clock is provided to clock the initialization value into the flip-flop. The innovative IVC circuit and the state of the previous latch in the scan path combined with the inverters within the scan path generate the initialization state to which the flip-flops are set in one cycle of operation. Again, during sleep mode (mode=1), the scan paths are fixed with constant values that prevent toggling, when in normal scan mode (mode=0) the scan paths are connected for normal test operation. The following table summarizes the logical implementation of the input vector control using various force_cell(n) as shown.

| latch(n) sleep value | latch(n − 1) sleep value | desired latch(n) init value | force_cell(n) required |
|---|---|---|---|
| 0 | 0 | 0 | force0_noinvert |
| 0 | 1 | 0 | force0_invert |
| 1 | 0 | 0 | force1_noinvert |
| 1 | 1 | 0 | force1_invert |
| 0 | 0 | 1 | force0_invert |
| 0 | 1 | 1 | force0_noinvert |
| 1 | 0 | 1 | force1_invert |
| 1 | 1 | 1 | force1_noinvert |

Implementing the invention in a microprocessor design makes possible the low power operation with global IC power savings of up to 25%. To summarize the benefits, entering and exiting the sleep mode is achieved by the toggling of just one signal instead of the traditional two or three suffices to carry out scanning, reducing power overhead for entering a low-leakage state. Furthermore the sleep state is entered and exited in just one clock cycle instead of many cycles normally required to scan the whole scan ring. Accordingly, additional routing (and capacitance) required by the novel modification is very small. And the mode signal used to control the IVC-force cells may be recycled from the block dedicated to the local clock generation, removing or obviating the need for additional global signal routing. This local change requires negligible additional wires and congestion therefrom, and very localized and small logical changes to existing designs.

While the proposed technique does not recover the states of the flip-flops after exiting the low power state, the inventive design shows marked improvement nevertheless with respect to conventional operation because large parts of the logic in conventional microprocessors do not require being reset back to their pre-sleep state during normal operation. The invention may therefore be implemented in many pipelines and quiescent processor/functional units at little or no cost no cost, and require only two clock cycles to enter and exit the low leakage mode.

Figure 5:
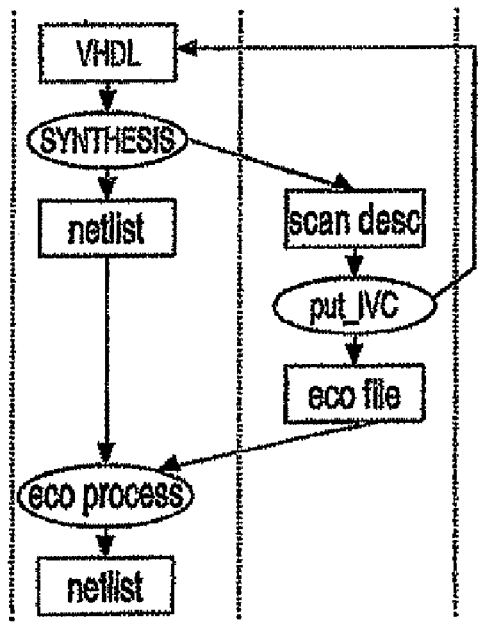
FIG. 5 depicts a flow diagram that depicts the processing flow for implementing the present invention in a VLSI design process.

Again, implementation of the inventive IVC circuitry within a conventional scan-based design results in a drastic improvement over conventional initialization techniques which may require hundred of cycles to scan the whole latch chain. In the last stages of an IC design process, a standard ECO (Engineering Change Order) process could be used to implement the "On-the-fly Minimum Power Transition". During the process or change operation, a prototype tool or process may employ the scan chain information provided during the RTL synthesis to determine which IVC-force cells to insert, and where the IVC-force cells should be inserted. The outputs of that tool are an ECO file, and a VHDL patch. The first is used to update the logic design netlist, while the second updates the VHDL for logic consistency, as may be seen in FIG. 5.

Figure 6:
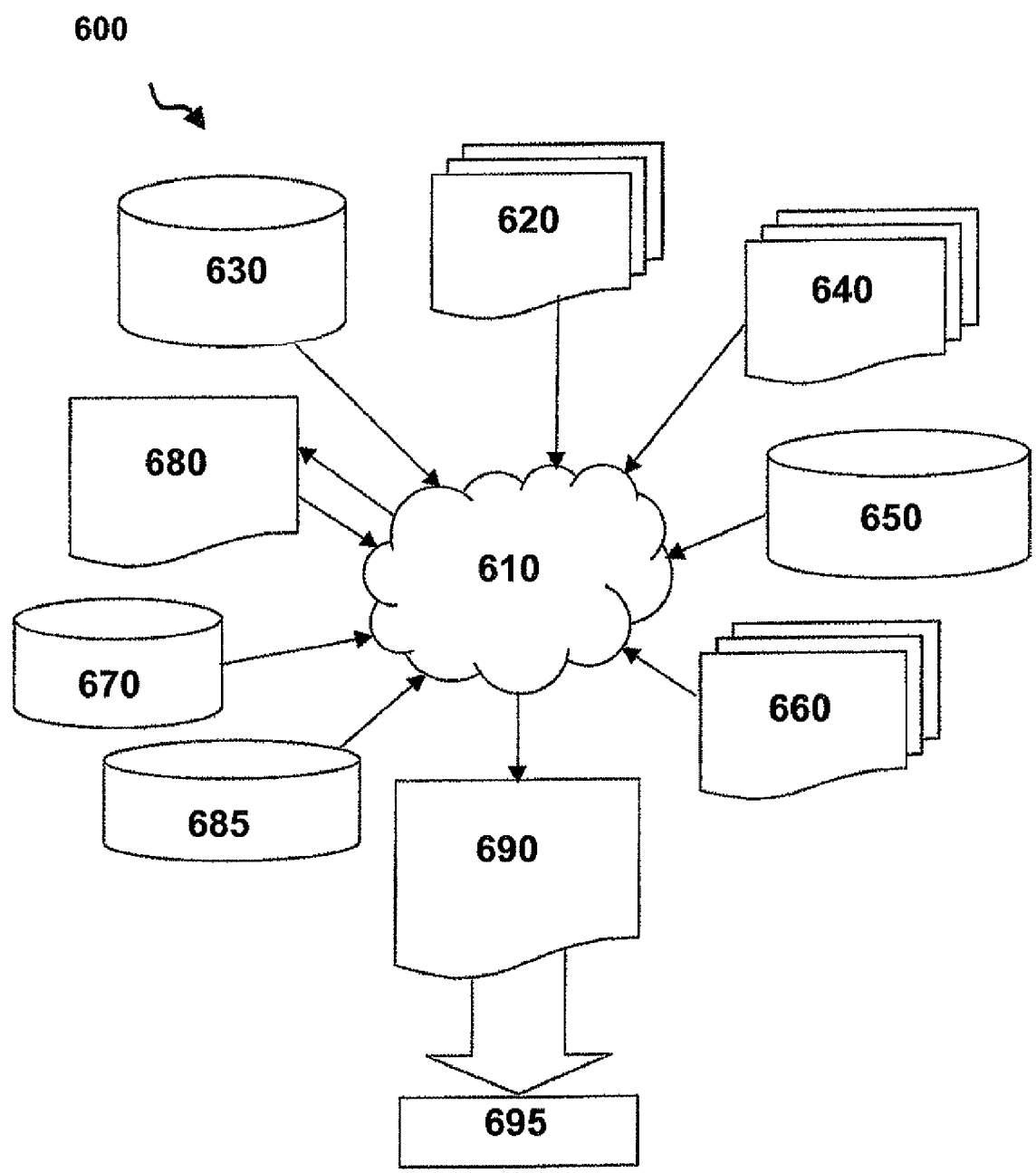
FIG. 6 is a flow diagram of a design process used in semiconductor design, manufacturing, and/or test.

FIG. 6 shows a block diagram of an exemplary design flow 600. Design flow 600 may vary depending on the type of IC being designed. For example, a design flow 600 for building an application specific IC (ASIC) may differ from a hypothetical design flow (not shown in the drawing figures) for designing a standard component. Design structure 620 is preferably an input to a design process 610 and may come from an IP provider, a core developer, or other design company or may be generated by the operator of the design flow, or from other sources. Design structure 620 comprises the inventive scan chain circuitry such as that depicted in FIGS. 1-5 herein, and implemented in an LSSD or GSD VLSI processor design in accordance with the invention. Design structure 620 may comprise or exist in the form of schematics or HDL, a hardware-description language (e.g., Verilog, VHDL, C, etc.). Design structure 620 may be contained on one or more machine-readable medium. For example, design structure 620 may be a text file or a graphical representation of a VLSI design that uses the novel scan-chain and novel IVC circuits and functioning to implement scan mode operation, an initialization operation or low-power IVC operation, as described above.

Design process 610 preferably synthesizes (or translates) a VLSI circuit with the novel scan chain circuitry into a netlist 680, where netlist 680 is, for example, a list of wires, transistors, logic gates, control circuits, I/O, models, etc. that describes the connections to other elements and circuits in an integrated circuit design and recorded on at least one of machine readable medium. This may be an iterative process in which netlist 680 is re-synthesized one or more times depending on design specifications and parameters for the circuit. Moreover, design process 610 may include using a variety of inputs; for example, inputs from library elements 630 which may house a set of commonly used elements, circuits, and devices, including models, layouts, and symbolic representations, for a given manufacturing technology (e.g., different technology nodes, 32 nm, 45 nm, 90 nm, etc.), design specifications 640, characterization data 650, verification data 660, design rules 670, and test data files 685 (which may include test patterns and other testing information).

Design process 610 may further include, for example, standard circuit design processes such as timing analysis, verification, design rule checking, place and route operations, etc. One of ordinary skill in the art of integrated circuit design can appreciate the extent of possible electronic design automation tools and applications used in design process 610 without deviating from the scope and spirit of the invention. The design structure of the invention is not limited to any specific design flow.

Design process 610 preferably translates an embodiment of the invention as shown in FIGS. 1-5 along with any additional integrated circuit design or data (if applicable), into a second design structure 690. Design structure 690 resides on a storage medium in a data format used for the exchange of layout data of integrated circuits (e.g. information stored in a GDSII (GDS2), GL1, OASIS, or any other suitable format for storing such design structures). Design structure 690 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1-5. Design structure 690 may then proceed to a stage 695 where, for example, design structure 690: proceeds to tape-out, is released to manufacturing, is released to a mask house, is sent to another design house, is sent back to the customer, etc.

Although a few examples of the present invention have been shown and described, it would be appreciated by those skilled in the art that changes may be made in these embodiments without departing from the principles and spirit of the invention, the scope of which is defined in the claims and their equivalents.

The invention claimed is:

1. A non-transitory machine readable medium including a design structure, the design structure embodied or represented as executable program code which, when executed, causes a machine to perform a method for creating a VLSI circuit, wherein the VLSI circuit includes an IVC-based scan chain for implementing lowered global power dissipation in a semiconductor chip, the method comprising:
creating the VLSI circuit including the scan chain, wherein the scan chain comprises:
at least two flip-flops, including a first flip-flop and a second flip-flop, configured to operate in normal mode operation, in scan mode operation and in low leakage power mode operation, where each flip-flop includes a data input, a data output, a clock input, a scan-in input and a scan-out output; and
an input vector control (IVC) circuit electrically connected between the scan-out output of the second flip-flop and the scan-in input of the first flip-flop within a scan chain, the IVC circuit comprising:
a mode control element for controlling operation of the first flip-flop to one of: scan mode, low power leakage mode and initialization mode, wherein the first flip-flop is set to a data output value upon exit from the low power leakage mode, the set data output value equivalent to a value that the first flip-flop is set to at initialization during normal mode operation.

2. The non-transitory machine readable medium as set forth in claim 1, wherein the method further comprises:
generating a netlist, which describes the VLSI circuit including the scan chain.

3. The non-transitory machine readable medium of claim 1, wherein the method further comprises: outputting data used for creating layout of the scan chain.

4. The non-transitory machine readable medium of claim 1, wherein the method further comprises: creating at least one of test data files, characterization data, verification data, or design specifications.

5. The non-transitory machine readable medium as set forth in claim 1, wherein the mode control element, in a presence of an active scan enable signal, compels the first flip-flop to operate in scan mode in a presence of an inactive mode select signal and in low leakage power mode when the mode select signal is active.

6. The non-transitory machine readable medium as set forth in claim 1, wherein the mode control element comprises one of:
a dual-input logical NAND element electrically connected at its output to an inverter; and
an inverter electrically connected at its output to a dual-input logical NAND element.

7. The non-transitory machine readable medium as set forth in claim 1, wherein a logic comprising the scan chain is inverted, and wherein the mode control element comprises one of:
a dual-input logical NOR element; and
an inverter electrically connected to an input of a dual-input exclusive NOR element.

* * * * *